United States Patent [19]

Ohe et al.

[11] Patent Number: 5,499,267
[45] Date of Patent: Mar. 12, 1996

[54] SPREAD SPECTRUM COMMUNICATION SYSTEM

[75] Inventors: Ichirou Ohe; Yutaka Nakamura; Norihiro Suzuki, all of Hamamatsu, Japan

[73] Assignee: Yamaha Corporation, Hamamatsu, Japan

[21] Appl. No.: 145,031

[22] Filed: Oct. 29, 1993

Related U.S. Application Data

[63] Continuation of Ser. No. 686,493, Apr. 17, 1991, abandoned.

[30] Foreign Application Priority Data

Apr. 19, 1990 [JP] Japan ................... 2-104183

[51] Int. Cl.$^6$ .................. H04B 1/707; H04B 1/69
[52] U.S. Cl. .................. 375/206; 380/34; 375/200; 375/205
[58] Field of Search ............... 375/1, 200–210; 380/34; 370/18

[56] References Cited

U.S. PATENT DOCUMENTS 3,475,558 10/1969 Cahn ........................ 370/18
4,736,390 4/1988 Ward et al. ............... 375/1 X
4,962,508 10/1990 Kingston ................... 375/1

*Primary Examiner*—Bernarr E. Gregory
*Attorney, Agent, or Firm*—Loeb and Loeb

[57] ABSTRACT

A spread spectrum communication system includes a receiving section which receives a signal produced by modulating a carrier of a predetermined frequency with a spread spectrum signal which has been modulated with a spread code of a clock frequency fC and mixes the received signal with a local oscillation signal to provide a spread spectrum signal component wherein a local oscillation frequency fL of said local oscillation signal is set at $fL \approx fC+fo$ or $fL > fC+fo$ or $fL \approx fo-fC$ or $fL < fo-fC$ where fo represents frequency of said received signal. The received signal may be a signal which has been converted to an intermediate frequency signal after being received by the receiving section. The spread spectrum communication system can prevent a spread spectrum signal from being impaired due to variation in a transmission frequency or oscillation frequency in a receiving section and can thereby accurately demodulate the received signal.

17 Claims, 4 Drawing Sheets

SPREAD SPECTRUM COMMUNICATION SYSTEM

This is a continuation of application Ser. No. 07/686,493, filed Apr. 17, 1991, now abandoned.

BACKGROUND OF THE INVENTION

This invention relates to a communication system utilizing a spread spectrum communication and, more particularly, to a communication system of this type capable of preventing a spread spectrum signal from being impaired due to variation in a transmission frequency or local oscillation frequency in a receiving section and thereby capable of accurately demodulating a received signal.

The spread spectrum communication is a communication system in which data is transmitted with a broadened band (i.e., with spread spectrum) by modulating data to be transmitted with a code system called a pseude noise signal. This communication system has the feature that data can be transmitted without being affected by a signal distortion or an interfering wave in the transmission path.

The basic principle of a direct spread system which is representative of the spread spectrum communication system will be described with reference to FIG. 2. In a transmitter 10, a spread code (i.e., pseudo noise signal) which repeats a predetermined pattern is generated by a PN system generator 12. Data signal for transmission is modulated with this spread code in a modulator 14 and a spread spectrum signal thereby is produced. A carrier (frequency fo) is modulated with this spread spectrum signal in a modulator 16 and thereafter is transmitted from an antenna 18.

In a receiver 20, a signal received by an antenna 22 is applied to a receiving section 24 and the spread spectrum signal is extracted from the received signal. Then, the extracted spread spectrum signal is correlated with the spread code by a correlator 26 whereby the spread spectrum signal is demodulated. Further, the transmitted data (correlated spread spectrum signal) is demodulated (by, e.g., PCM demodulation) by a demodulator 28 to provide demodulated data.

FIGS. 3a and 3b show examples of construction of receiving sections 24 of a prior art spread spectrum communication system. FIG. 3a shows a receiving section 24 in which a received signal is mixed directly with a local oscillation signal and thereafter a carrier component is removed from the mixed signal to obtain a spread spectrum signal. A signal $P(t) \cdot \sin 2\pi fot$ (where $P(t)$ represents a spread spectrum signal and fo represents frequency of the received signal (i.e., transmission frequency)) received by the antenna 22 is mixed with a local oscillation signal $\sin 2\pi fLt$ (where fL represents local oscillation frequency) in a mixer 30 to provide a converted signal SM. This converted signal SM is filtered through a low-pass filter 32 to provide a signal SM' which contains a spread spectrum signal component.

FIG. 3b shows a receiving section 24 in which a received signal is once converted to an intermediate frequency and thereafter is mixed with a local oscillation signal to remove a carrier component and thereby provide a spread spectrum signal. A received signal $P(t) \cdot \sin 2\pi \text{fo't}$ is mixed with a local oscillation signal $\sin 2\pi fL't$ (where fL' represents a local oscillation frequency) to produce an intermediate frequency signal $P(t) \cdot \sin 2\pi fot$ (where fO represents intermediate frequency) in a mixer 34. This intermediate frequency is mixed with a local oscillation frequency signal $\sin 2\pi fLt$ (where fL represents local oscillation frequency) in a mixer 30 to produce a converted signal SM. The converted signal SM is filtered through a low-pass filter 32 to provide a singal SM' containing a spread spectrum signal component.

In FIGS. 3a and 3b, the converted signal SM is expressed by the equation:

$$SM = P(t) \cdot \sin 2\pi fot \cdot \sin 2\pi fLt \quad (1)$$
$$= -0.5 \cdot P(t) [\cos 2\pi(fo+fL)t - \cos 2\pi(fo-fL)t]$$

This converted signal SM is applied to the low-pass filter 32 to have the fo+fL component removed and the following signal SM' thereby is obtained:

$$SM'=0.5P(t) \cdot \cos 2\pi(fo-fL)t \quad (2)$$

In the past, the local oscillation frequency fL was set at fL=fo, i.e., at the same value as the transmission frequency fo. The equation (2) therefore becomes $$SM'=0.5 \cdot P(t) \quad (3)$$

and the spread spectrum signal P(t) thereby is obtained.

As described above, the local oscillation frequency fL was set at fL=fo in the prior art systems. It has been found, however, that it is actually difficult to achieve complete coincidence between the transmission frequency fo and the local oscillation frequency fL because there is variation in both of these frequencies fo and fL. For this reason, a difference component $\Delta f=fL-fo$ is actually produced, so that the signal SM' becomes $$SM'=0.5 \cdot P(t) \cdot \cos 2\pi \Delta ft$$

In the spread spectrum communication, clock frequency fC of a spread code is generally set above several MHz with a resulting relation $\Delta f<fC$. Accordingly, as shown in FIG. 4, the signal SM' becomes a waveform resulting from modulating the spread spectrum signal P(t) with a signal $\cos 2\pi \Delta ft$ and, as a result, the phase information of the original spread spectrum signal P(t) is impaired. This makes it impossible to demodulate both the spread spectrum signal and transmitted data (correlated spread spectrum signal) (FIG. 2). For preventing such impairing of the phase information of the original spread spectrum signal P(t), a phase locked loop circuit for enabling the local oscillation frequency fL to coincide exactly with the received signal frequency fo is required and the circuit construction therefore becomes complicated.

It is an object of the invention to provide a spread spectrum communication system capable of preventing a spread spectrum signal from being impaired due to variation in transmission frequency and local oscillation frequency without requiring a complicated circuit construction.

SUMMARY OF THE INVENTION

For achieving the above described object, the spread spectrum communication system according to the invention comprises a receiving section which receives a signal produced by modulating a carrier of a predetermined frequency with a spread spectrum signal which has been modulated with a spread code of a clock frequency fC and mixes the received signal with a local oscillation signal to provide a spread spectrum signal component wherein a local oscillation frequency fL of said local oscillation signal is set at $fL \approx fC+fo$ or $fL>fC+fo$ or $fL \approx fo-fC$ or $fL<fo-fC$ where fo represents frequency of said received signal. The received signal may be a signal which has been converted to an intermediate frequency signal after being received by the receiving section.

According to the invention, by setting the local oscillation frequency fL of the local oscillation signal at fL≈fC+fo or fL>fC+fo, or fL=fo−fC or fL<fo−fC, frequency of a difference component between fo anf fL becomes equal to or larger than the clock frequency of the spread code as will be described later and, accordingly, approximately one cycle or more of the difference component is included in one clock of the spread code. Hence, notwithstanding occurrence of variation in fo or fL, phase information of a spread spectrum signal is left in the output signal from the receiving section of the system and, as a result, impairing of the spread spectrum signal is prevented and received data can be accurately demodulated. Moreover, this can be achieved by a system of the same circuit construction as the prior art system with only change in the set local oscillation frequency. Accordingly, complexity in the circuit design as compared with the prior art system can be avoided.

Embodiments of the invention will now be described with reference to the accompanying drawings.

BRIEF DESCRIPTION OF THE DRAWINGS

In the accompanying drawings.

DESCRIPTION OF PREFERRED EMBODIMENTS

Figure 1A:
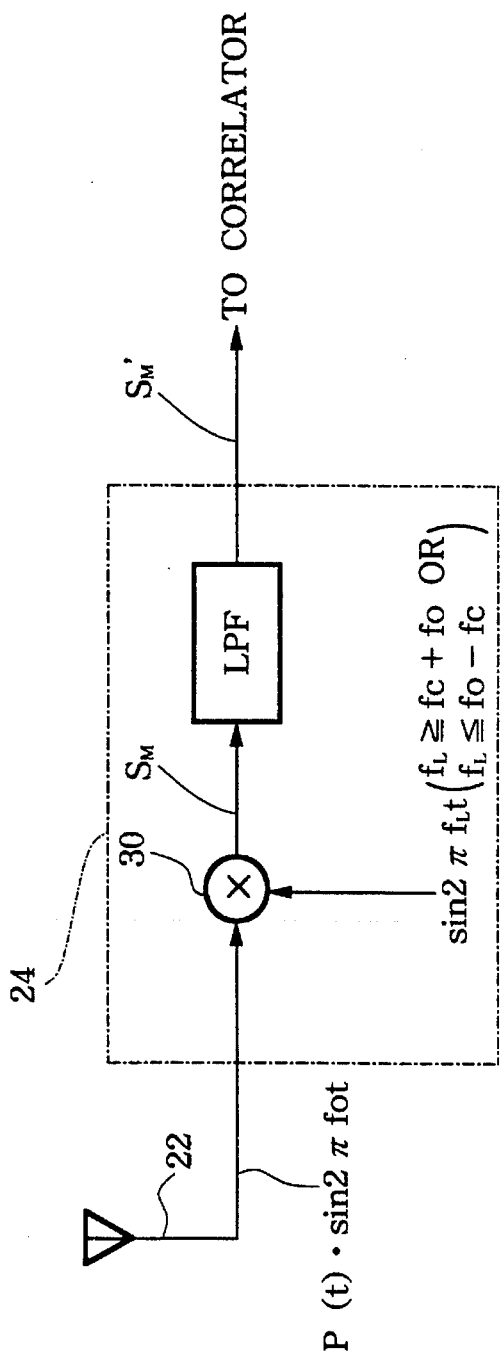
FIGS. 1a and 1b are block diagrams showing embodiments of the spread spectrum communication system according to the invention.
Figure 1B:
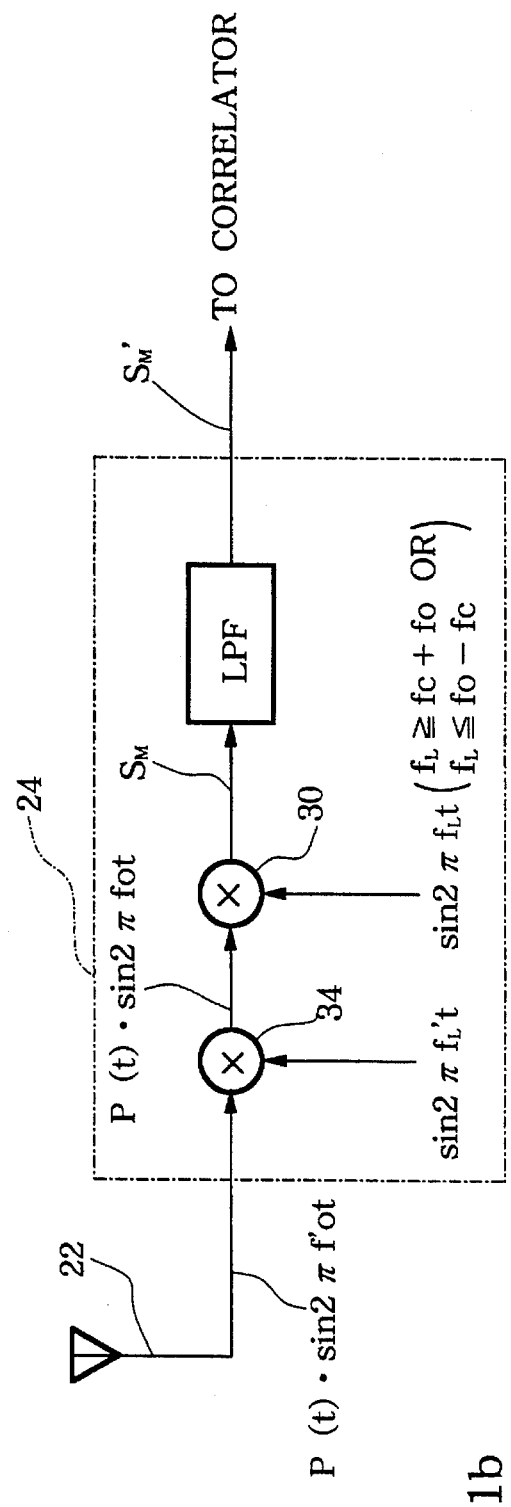
Figure 2:
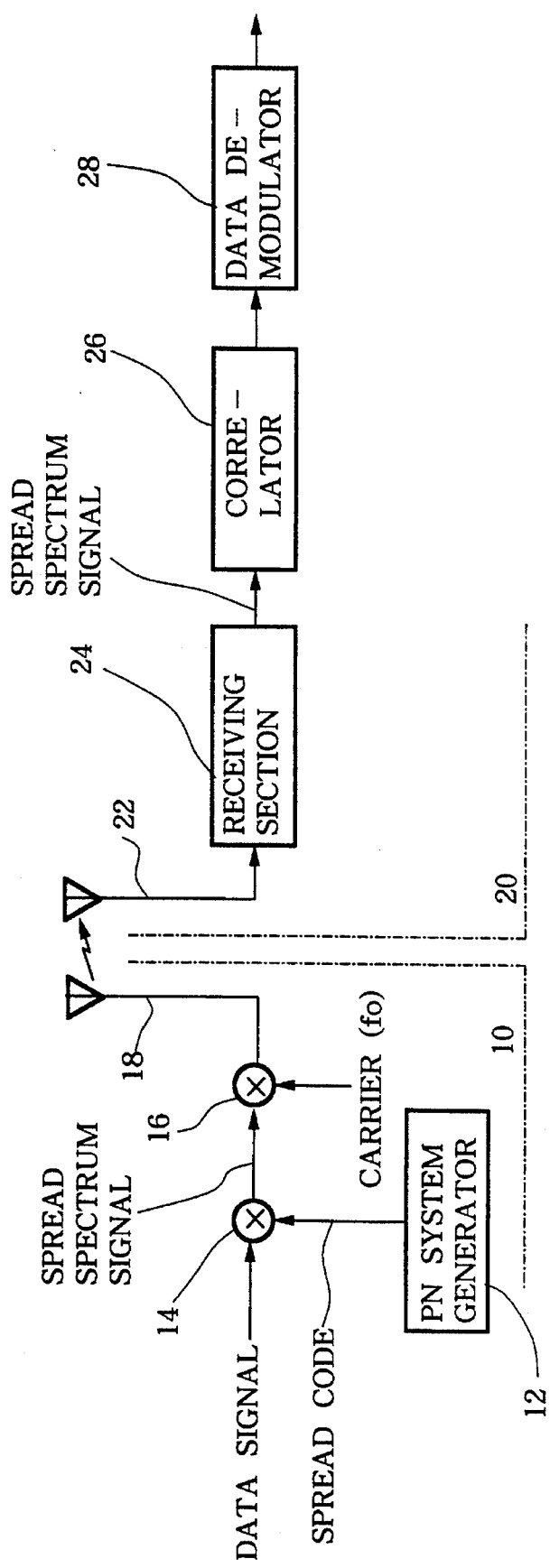
FIG. 2 is a block diagram showing the basic principle of the direct spread spectrum communication system.
Figure 3A:
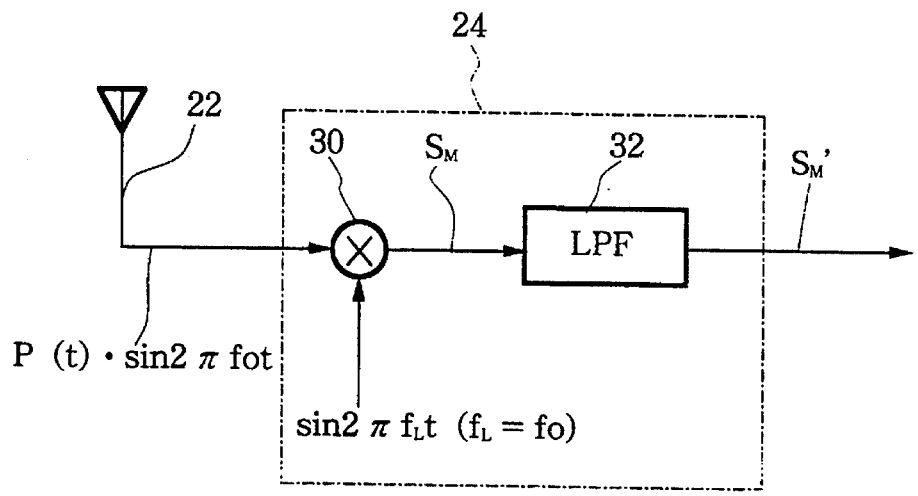
FIGS. 3a and 3b are block diagrams showing examples of the prior art spread spectrum communication system.
Figure 3B:
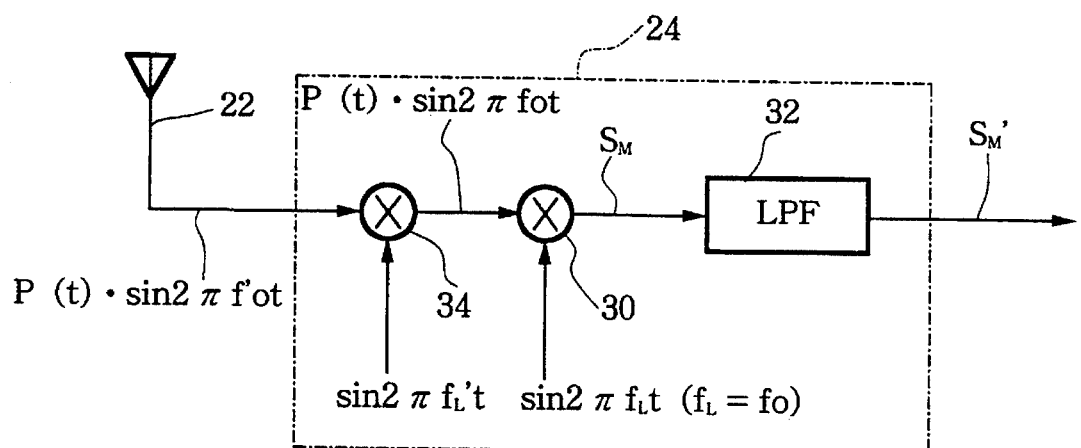
Figure 4:
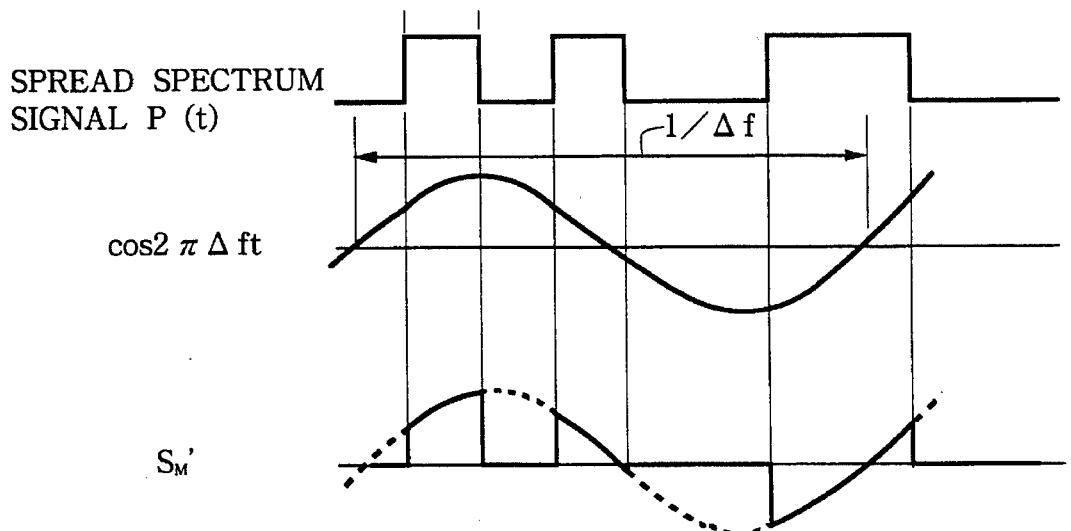
FIG. 4 is a waveform diagram showing operation of the prior art system.

Preferred embodiments of the spread spectrum communication system will be described with reference to FIGS. 1a and 1b. In FIGS. 1a and 1b, the same component parts as those of the prior art systems of FIGS. 3a and 3b are designated by the same reference characters.

FIG. 1a shows an embodiment in which a received signal is directly mixed with a local oscillation signal to remove a carrier component and thereby obtain a spread spectrum signal. A signal $P(t)\cdot\sin 2\pi f_o t$ (where P(t) represents spread spectrum signal and fo represents frequency of the received signal) is mixed with local oscillation signal $\sin 2\pi f_L t$ (where fL represents local oscillation frequency) and a converted signal SM is thereby produced. This converted signal SM is filtered through a low-pass filter 32 to provide a signal SM' containing a spread spectrum signal component.

FIG. 1b shows an embodiment in which a received signal is once converted to an intermediate frequency signal and thereafter is mixed with a local oscillation signal to remove a carrier component and thereby provide a spread spectrum signal. A received signal $P(t)\cdot\sin 2\pi f_o' t$ is mixed with a local oscillation signal $\sin 2\pi f_L' t$ (where fL' represents local oscillation frequency) to produce an intermediate frequency signal $P(t)\cdot\sin 2\pi f_o t$ (where fo represents an intermediate frequency) in a mixer 34. This intermediate frequency is mixed with a local oscillation signal $\sin 2\pi f_L t$ (where fL represents local oscillation frequency) in a mixer 30 to produce a converted signal SM. The converted signal SM is filtered through a low-pass filter 32 to provide a signal SM' containing a spread spectrum signal component.

In FIGS. 1a and 1b, the local oscillation frequency fL is set at fL≧fC+fo or fL≧fo−fC According to the construction of FIGS. 1a and 1b, the converted signal SM is expressed by $$\begin{aligned}SM &= P(t)\cdot\sin 2\pi f_o t \cdot \sin 2\pi f_L t \\ &= -0.5\cdot P(t)[\cos 2\pi(f_o+f_L)t - \cos 2\pi(f_o-f_L)t]\end{aligned} \quad (4)$$

This converted signal SM is applied to the low-pass filter 32 to have the fo+fL component removed and the following signal SM' thereby is obtained:

$$\begin{aligned}SM' &= 0.5\cdot P(t)\cdot\cos 2\pi(f_o-f_L)t \\ &= 0.5\cdot P(t)\cdot\cos 2\pi(f_L-f_o)t\end{aligned} \quad (5)$$

If difference component fS between fL and fo is fL−fo=fS, the difference component fS becomes $$fS \geq fC \quad (6)$$

from the above described condition fL≧fC+fo. Also, since $\cos 2\pi(f_L-f_o)t = \cos 2\pi(f_o-f_L)t$, if difference component fS is fo−fL=fS, the difference component fS becomes $$fS \geq fC \quad (7)$$

from the above described condition fL≦fo−fC. From the formulas (6) and (7) above, the difference component fS between the local oscillation frequency fL and the received signal frequency or intermediate frequency fo in both cases becomes equal to or higher than the clock frequency fC of the spread code (either of the two formulas can be employed as desired).

Figure 5:
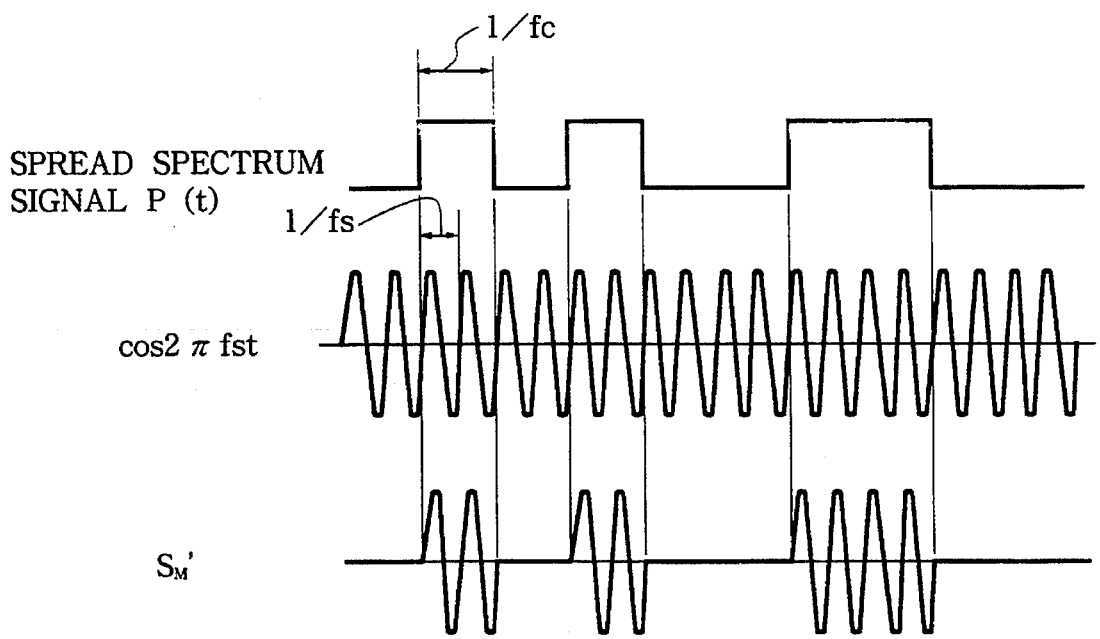
FIG. 5 is a waveform diagram showing operation of the embodiments of FIGS. 1a and 1b.

FIG. 5 shows waveforms of the signals appearing in the respective component parts of the systems of FIGS. 1a and 1b. In FIG. 5, the difference signal frequency fS is assumed to be set at fS=2fC. Since, as illustrated, the clock frequency fC of the spread code is lower than the difference signal frequency fS, plural cycles of the difference signal frequency fS are included in one chip (1/fC) of the spread spectrum signal. Accordingly, phase information of the spread spectrum signal P(t) is completely left in the signal SM' and, by detecting this signal SM' by a suitable known method such as an envelope detection, the spread spectrum signal P(t) can be demodulated.

It is now assumed that, in the systems of FIGS. 1a and 1b, the local oscillation frequency fL or received signal frequency or intermediate frequency fo has changed due to variation in oscillation frequency of any oscillator or for other reason and has become $$|f_L - f_o| = fS + \Delta f.$$

Since, as described above, the clock frequency fC of the spread code is above several MHz and FS≧fC, the difference signal frequency fS becomes above several MHz. Since, on the other hand, a crystal oscillator is generally used in a signal source for a transmitter or receiver, Δf is very small (below several 10 kHz to several kHz) which is in the order of $10^{-4}$ or less of fo or fL. On the other hand, fS is above several MHz and is in the order of $10^{-1}$ to $10^{-2}$ of fo or fL, so that there exists the relation $fS+\Delta f \approx fS$ From this formula, it will be understood that generation of the $\Delta f$ component hardly affects the signal SM'.

Figure 6:
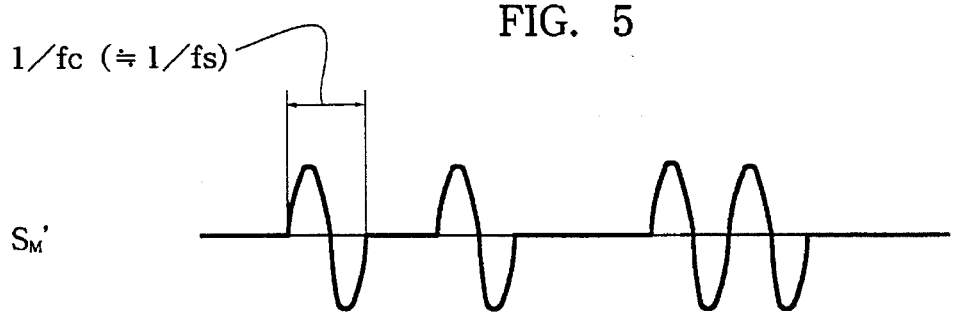
FIG. 6 is a waveform diagram showing operation of the embodiment of FIGS. 1a and 1b at fS≈fC.

In the above described embodiment, description has been made about a case where fS>fC (i.e., fL>fC+fo or fL<fo−fC). Alternatively, the difference signal frequency fS may be fS≈fC (i.e., fL≈fC+fo or fL≈fo−fC). In the latter case, as shown in FIG. 6, approximately one cycle of the difference signal frequency fS+Δf containing the frequency variation is included in one clock of the spread code and, in this case also, phase information of the spread spectrum signal P(t) is left in the signal SM'.

What is claimed is:

1. A spread spectrum communication processing system for a modulated signal produced by modulating a carrier with a spread spectrum signal, the modulated signal having a frequency fo, the spread spectrum signal being modulated with a spread code, the spread code having a clock frequency fc, the spread spectrum communication processing system comprising:

an antenna for receiving the modulated signal; and a section for processing the modulated signal, the section connected to said antenna, the section comprising:

local oscillation means for supplying a local oscillation signal, the local oscillation signal having a local oscillation frequency fL wherein the local oscillation frequency fL is greater than or equal to approximately fc+fo, mixing means for mixing the modulated signal from said antenna with the local oscillation signal from said local oscillation means, low-pass filter means for extracting a signal containing a component of the spread spectrum signal from an output of said mixing means.

2. A spread spectrum communication processing system as defined in claim 1 further comprising a correlator for correlating the spread spectrum signal with the spread code to demodulate the spread spectrum signal and a demodulator for demodulating an output of the correlator by means of PCM demodulation.

3. A spread spectrum communication processing system for a modulated signal produced by modulating a carrier with a spread spectrum signal, the modulated signal having a frequency fo, the spread spectrum signal being modulated with a spread code, the spread spectrum code having a clock frequency fc, the spread spectrum communication processing system comprising:

an antenna for receiving the modulated signal; and a section connected to said antenna comprising:

local oscillation means for supplying a local oscillation signal, the local oscillation signal having a local oscillation frequency fL wherein the local oscillation frequency fL is less than or equal to approximately f−fo, mixing means for mixing the modulated signal from said antenna with the local oscillation signal from said local oscillation means, a low-pass filter for extracting a signal containing a component of the spread spectrum signal from an output of said mixing means.

4. A spread spectrum communication processing system as defined in claim 3 further comprising a correlator for correlating the spread spectrum signal with the spread code to demodulate the spread spectrum signal and a demodulator for demodulating an output of the correlator by means of PCM demodulation.

5. A spread spectrum communication processing system for a modulated signal produced by modulating a carrier with a spread spectrum signal, the spread spectrum signal being modulated with a spread code, the spread spectrum code having a clock frequency fc, the spread spectrum communication processing system comprising:

an antenna for receiving the modulated signal; and a receiving section comprising:

IF conversion means connected to said antenna for converting the modulated signal into an intermediate frequency signal having a frequency fo, local oscillation means for supplying a local oscillation signal, the local oscillation signal having a local oscillation frequency fL wherein the local oscillation frequency fL is greater than or equal to approximately fc+fo, mixing means for mixing the intermediate frequency signal from said IF conversion means with the local oscillation signal from said local oscillation means, low-pass filter means for extracting a signal containing a component of the spread spectrum signal from an output of said mixing means.

6. A spread spectrum communication processing system as defined in claim 5 wherein said IF converting means comprises IF local oscillation means for supplying an IF local oscillation signal which has a different frequency from that of said local oscillation means and IF mixing means for mixing the IF local oscillation signal from said IF local oscillation means with the modulated signal from said antenna so as to provide the intermediate frequency signal.

7. A spread spectrum communication processing system as defined in claim 5 further comprising a correlator for correlating the spread spectrum signal with the spread code to demodulate the spread spectrum signal and a demodulator for demodulating an output of the correlator by means of PCM demodulation.

8. A spread spectrum communication processing system for a modulated signal produced by modulating a carrier with a spread spectrum signal, the spread spectrum signal being modulated with a spread spectrum code, the spread spectrum code having a clock frequency fc, the spread spectrum communication processing system comprising:

an antenna for receiving the modulated signal; and a receiving section comprising:

IF conversion means connected to said antenna for converting the modulated signal into an intermediate frequency signal having a frequency fo, local oscillation means for supplying a local oscillation signal, the local oscillation signal having a local oscillation frequency fL wherein the local oscillation frequency fL is less than or equal to approximately fc−fo, mixing means for mixing the intermediate frequency signal from said IF conversion means with the local oscillation signal from said local oscillation means, low-pass filter means for extracting a signal containing a component of the spread spectrum signal from an output of said mixing means.

9. A spread spectrum communication processing system as defined in claim 8 wherein said IF converting means comprises IF local oscillation means for supplying an IF local oscillation signal which has a different frequency from that of said local oscillation means and IF mixing means for mixing the IF local oscillation signal from said IF local oscillation means with the modulated signal from said antenna so as to provide the intermediate frequency signal.

10. A spread spectrum communication processing system as defined in claim 8 further comprising a correlator for correlating the spread spectrum signal with the spread code to demodulate the spread spectrum signal and a demodulator for demodulating an output of the correlator by means of PCM demodulation.

11. A spread spectrum communication processing system for a modulated signal produced by modulating a carrier with a spread spectrum signal, the modulated signal having a center frequency fo, the spread spectrum signal being modulated with a spread code, the spread code having a clock frequency fc, the spread spectrum communication processing system comprising:

modulation signal receiving means for receiving the modulated signal, and a processing section comprising:
local oscillation means for supplying a local oscillation signal, the local oscillation signal having a local oscillation frequency fL wherein the local oscillation frequency fL is substantially greater than or equal to about an absolute value of the frequency difference between the clock frequency fc and the frequency fo,
mixing means for mixing the modulated signal from said modulation signal receiving means with the local oscillation signal from said local oscillation means,
low-pass filter means for extracting a signal containing a component of the spread spectrum signal from an output of said mixing means.

12. A method for processing a spread spectrum signal including a data signal generated through the use of a spread spectrum transmission technique using a pseudo random code having a clock frequency of fc, the spread spectrum signal centered around a carrier at a frequency of fo, the processing method comprising:

providing a local signal having a frequency fL, the magnitude of the difference in the frequency of fL and fo being approximately greater than or equal to fc; and mixing the generated local signal with the spread spectrum signal to generate a mixed signal.

13. The method of claim 12, the method further including low pass filtering the mixed signal to extract a data signal modulated with a pseudo random code; and demodulating the data signal from the output of the low pass filter.

14. The method of claim 12, wherein the spread spectrum transmission technique involves transmitting at a frequency fo, the method further comprising heterodyning the transmitted signal to an intermediate frequency of fo.

15. An apparatus for processing a spread spectrum signal including a data signal generated through the use of a spread spectrum transmission technique using a pseudo random code having a clock frequency of fc, the spread spectrum signal centered around a carrier at a frequency of fo, the processing method comprising:

a signal generator generating a signal having a frequency fL, the magnitude of the difference in the frequency of fL and fo being approximately greater than or equal to fc; and a frequency shifting circuit responsive to the generated local signal and the spread spectrum signal to generate an output spread spectrum signal in a frequency band centered at a frequency greater than or equal to about the magnitude of the difference in the frequencies fL and fo.

16. A spread spectrum communication receiving system for a modulated signal produced by modulating a carrier with a spread spectrum signal, the modulated signal having a frequency fo, the spread spectrum signal being modulated with a spread code, the spread code having a clock frequency fc, the spread spectrum communication receiving system comprising:

an antenna for receiving the modulated signal; and a receiving section for the modulated signal connected to said antenna comprising:
local oscillation means for supplying a local oscillation signal, the local oscillation signal having a local oscillation frequency fL wherein the local oscillation frequency fL is substantially greater than or equal to approximately an absolute value of the frequency difference between the clock frequency fc and the frequency fo,
mixing means for mixing the modulated signal from said antenna with the local oscillation signal from said local oscillation means,
low-pass filter means for extracting a signal containing a component of the spread spectrum signal from an output of said mixing means,
a means for correlating coupled to an output of the filter, and
a means for demodulating an output of the correlator.

17. A method for processing a spread spectrum signal including a data signal generated through the use of a spread spectrum transmission technique using a pseudo random code having a clock frequency of fc, the spread spectrum signal centered around a carrier at a frequency of fo, the processing method comprising:

providing a local signal having a frequency fL, the magnitude of the difference in the frequency of fL and fo being approximately greater than or equal to fc; and mixing the generated local signal with the spread spectrum signal to generate a mixed signal, filtering the mixed signal to provide a filter signal, correlating the filtered signal to provide a correlated signal, and demodulating the correlated signal.

* * * * *